Figure 1:
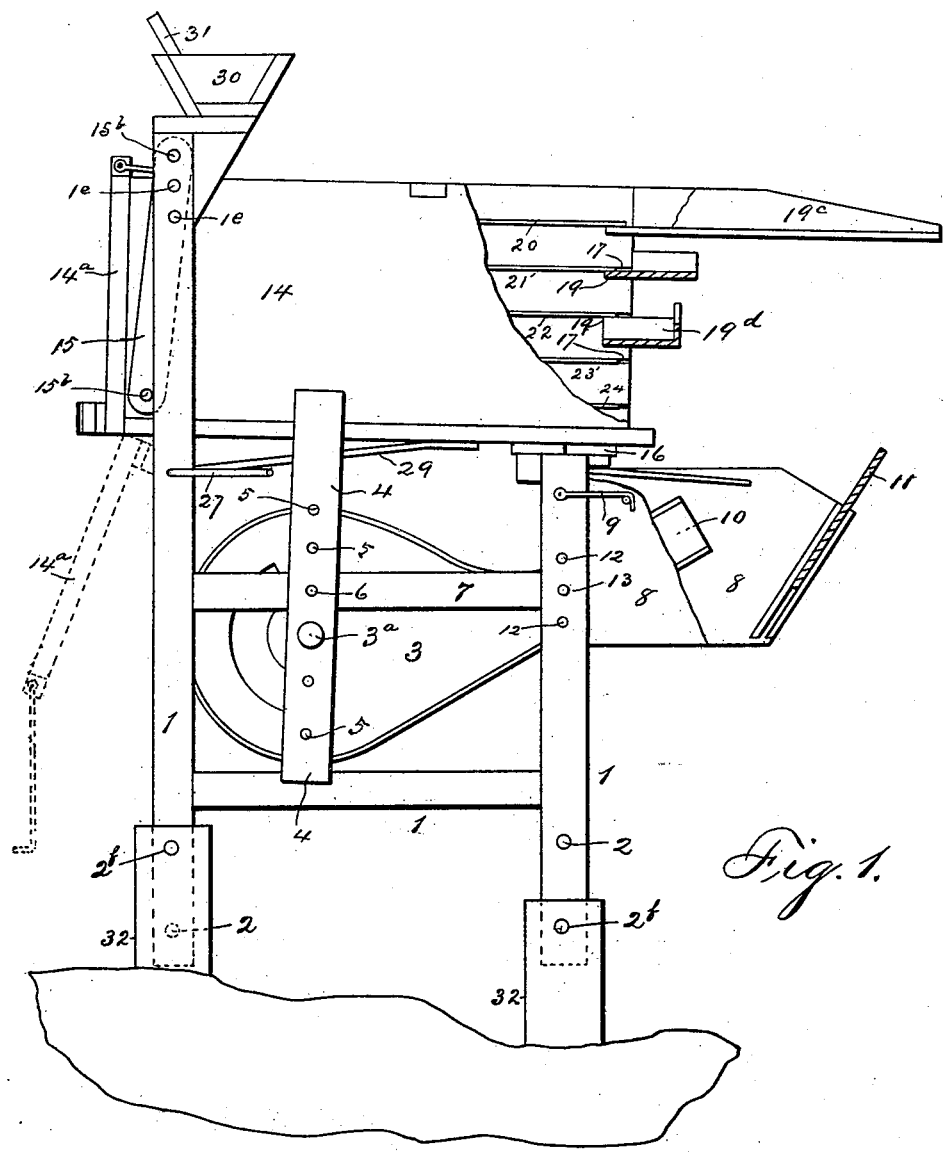

No. 626,705. Patented June 13, 1899.
H. E. KOCH.
GRAIN SEPARATOR.
(Application filed Apr. 4, 1898.)
(No Model.) 2 Sheets—Sheet 1.

WITNESSES:
Otis D. Swett.

INVENTOR
Henry E. Koch.
BY
Chas. D. Swett
ATTORNEY.

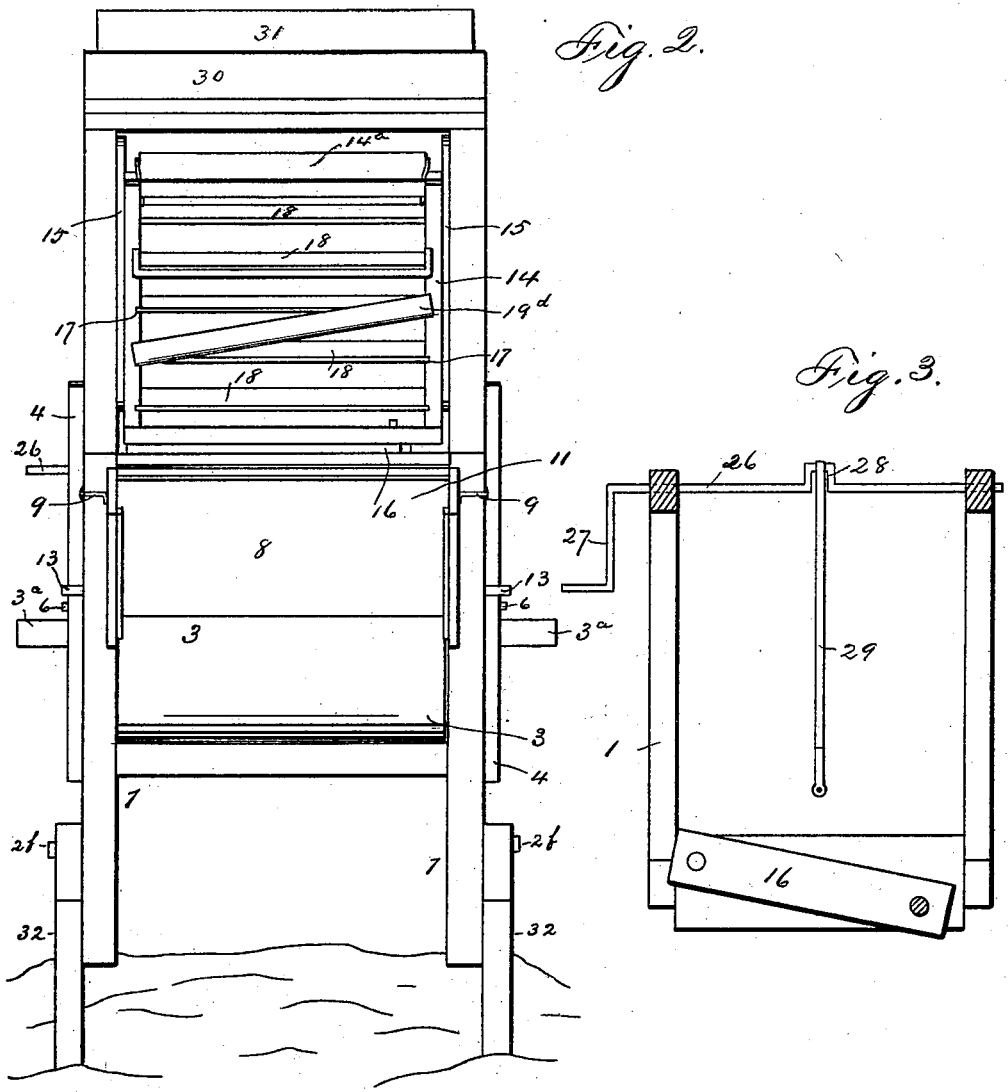

UNITED STATES PATENT OFFICE.

HENRY E. KOCH, OF HARTINGTON, NEBRASKA.

GRAIN-SEPARATOR.

SPECIFICATION forming part of Letters Patent No. 626,705, dated June 13, 1899.

Application filed April 4, 1898. Serial No. 676,344. (No model.)

*To all whom it may concern:*

Be it known that I, HENRY E. KOCH, a citizen of the United States, residing at Hartington, in the county of Cedar and State of Nebraska, have invented certain new and useful Improvements in Grain-Separators; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to such grain-separators as include means for both screening and winnowing the grain; and it consists in a novel arrangement of a series of sieves or screens having meshes of different grades of fineness and in an adjustable fanning or blowing mechanism. Its various features are fully illustrated in the accompanying drawings, in which—

Figure 1 is a side elevation, partly in section. Fig. 2 is a rear elevation of the invention, and Fig. 3 is a plan of the oscillatory mechanism and its connection with the upper part of the body-frame.

Like characters of reference denote corresponding parts in the different views.

1 indicates the body-frame of the machine, having leg-perforations 2 2.

The blower 3 is of usual construction, with its exit-opening 10 directed rearward just below the screen-casing. Its fan-shaft $3^a$ is journaled in adjustable hangers 4 4, which are suspended on the main frame by means of holes 5 5 to engage pegs 6 6, the latter passing through them into the cross-bars 7 7 on the frame 1. A wind-guide 8, covering the blower-exit, is hung by stout hooks 9 9 to frame 1. Its adjustable fender 11 controls the direction of the air-current. The rear part of the blower is supported and rendered adjustable by pegs 13 13, which pass through holes 12 12 in frame 1 and into corresponding holes in the fan-box.

The screen-case 14, having a front door $14^a$ to admit the screens, is hung within the frame by pendants 15 15, connected to the upper part of frame 1 and to the lower front part of case 14 by horizontal pivots $15^b$ $15^b$. This end of the case is raised or lowered by inserting the pivots $15^b$ in one of the higher or lower holes $1^c$ $1^c$ in the upper part of frame 1. The rear part of the case 14 is supported on a horizontally-oscillating bar 16, connected pivotally at one end to frame 1 and at the other end to the under side of case 14. Along the inner sides of the case 14 are parallel grooves 17 17 to receive the screens. Short recesses 19 19 are formed in the lower rear part of these grooves to hold the chutes $19^c$ and $19^d$ immediately below the ends of the screens.

Oscillatory motion is imparted to the screen-case by the revolution of the shaft 26, furnished with a crank 27 for hand use or with any gearing suitable for connection with other impelling power. A central loop-crank 28 on shaft 26, connected by arm 29 to the bottom of case 14, imparts a reciprocal fore-and-aft motion to said case, and simultaneously the bar 16 produces a lateral motion of the rear part of the case. The shaft $3^a$ of the fan in the blower is provided with a band-wheel or other means for connection with driving-power.

A hopper 30, provided with a gage 31, surmounts the front of the frame above the screens.

The meshes of the screens are graded from coarsest at the top to finest at the bottom, each screen being finer than the one above it.

In operation the contents of the hopper are let through upon the first screen 20, which catches the straw and coarse waste. This passes over chute $19^c$, unaffected by the air-blast, and all the grain and seeds go through and fall upon the second screen 21. The largest grain suitable for seeding is caught on this screen, goes down through the air-blast, and falls into a receptacle prepared for it. The grain has been denuded of a great portion of its fibrous covering by its friction with the meshes of the screens, and from this and from other chaff it is separated by the air-blast. The smaller grain and seeds pass through to the third screen 22. This screen is graded to intercept the good grain, which falls into a side chute $19^d$, which directs it into a receptacle. The screenings then fall upon the fourth screen 23, graded to let through mustard, Russian thistle, and other small seeds and to run off the common grain for cattle-feed, while millet and other seeds of the same size are run off by the fifth screen 24 and allows the mustard-seed to fall through upon the ground.

The screens need never be changed and may be used for cleaning any kind of grain. When the machine is not in use, the screen-case, chutes, blower, and wind-guide, being detachable, are removed and safely housed.

In setting up the machine on uneven ground stakes 32, with holes corresponding to those in the legs of the machine, are driven in the ground and secured by bolts 2$^f$ to the legs.

What I claim, and desire to secure by Letters Patent, is—

1. In a grain-separator, a fan journaled in and detachable from vertically-adjustable hangers, said adjustable hangers being pivotally connected with the body-frame, a series of holes in the rear parts of said frame, holes in the fan-casing in alinement therewith, and pins adapted to be inserted in said holes for the adjustment of said casing, substantially as described.

2. In a grain-separator, a fan journaled in and detachable from pivoted and vertically-adjustable hangers detachably connected with the frame, a vertically-adjustable fan-casing and air-trunk provided with laterally-extending pins at its rear end, hooks pivoted to the frame and adapted to engage said pins, and an adjustable fender attached to said air-trunk, substantially as described.

In testimony whereof I affix my signature in presence of two witnesses.

HENRY E. KOCH.

Witnesses:
OTTO H. KUHL,
W. H. MARTIN.